US011332341B2

(12) United States Patent
Huang et al.

(10) Patent No.: US 11,332,341 B2
(45) Date of Patent: May 17, 2022

(54) PERSONAL MOBILE TERMINAL AND A METHOD OF REQUESTING ELEVATOR SERVICE

(71) Applicant: Otis Elevator Company, Farmington, CT (US)

(72) Inventors: Wenbo Huang, Shanghai (CN); Jingyu Tong, Shanghai (CN); Lieping Wei, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 474 days.

(21) Appl. No.: 16/287,461

(22) Filed: Feb. 27, 2019

(65) Prior Publication Data

US 2019/0263627 A1 Aug. 29, 2019

(30) Foreign Application Priority Data

Feb. 28, 2018 (CN) .......................... 201810166830.X

(51) Int. Cl.
*B66B 1/46* (2006.01)
*H04W 4/33* (2018.01)
(Continued)

(52) U.S. Cl.
CPC ............... *B66B 1/468* (2013.01); *B66B 1/28* (2013.01); *B66B 1/3461* (2013.01);
(Continued)

(58) Field of Classification Search
CPC ......... B66B 1/468; B66B 1/28; B66B 1/3461; B66B 2201/103; B66B 2201/4615;
(Continued)

(56) References Cited

U.S. PATENT DOCUMENTS 6,109,396 A 8/2000 Sirag et al.
7,126,951 B2 10/2006 Belcea et al.
(Continued)

FOREIGN PATENT DOCUMENTS

CN 103068709 A 4/2013
CN 103093522 A 5/2013
(Continued)

OTHER PUBLICATIONS

European Search Report for application EP 19160087.3, dated Jul. 24, 2019, 9 pages.
(Continued)

*Primary Examiner* — Eugene Yun
(74) *Attorney, Agent, or Firm* — Cantor Colburn LLP

(57) ABSTRACT

The present invention provides an automatic elevator call system and a method for requesting an elevator service, belonging to the field of elevator intelligent control technologies. The automatic elevator call system of the present invention includes a wireless signal apparatus that is installed in an elevator system and broadcasts a corresponding wireless signal around, wherein the automatic elevator call system detects the wireless signal and a signal strength value thereof by using a personal mobile terminal carried by a passenger, and automatically sends an elevator service request command to the wireless signal apparatus when the signal strength value is greater than or equal to a predetermined threshold. The wireless signal apparatus wireless signal apparatus. The present invention can further improve elevator call experience of passengers.

21 Claims, 3 Drawing Sheets

(51) Int. Cl.
*H04W 4/80* (2018.01)
*B66B 1/28* (2006.01)
*B66B 1/34* (2006.01)
*H04W 4/021* (2018.01)

(52) U.S. Cl.
CPC ............. *H04W 4/021* (2013.01); *H04W 4/33* (2018.02); *H04W 4/80* (2018.02); *B66B 2201/103* (2013.01); *B66B 2201/4615* (2013.01); *B66B 2201/4653* (2013.01)

(58) Field of Classification Search
CPC . B66B 2201/4653; B66B 1/06; B66B 1/3423; H04W 4/33; H04W 4/80; H04W 4/021
USPC ........................................................ 455/41.2
See application file for complete search history.

(56) References Cited

U.S. PATENT DOCUMENTS

| | | | |
|---|---|---|---|
| 7,347,303 | B2 | 3/2008 | Kontturi et al. |
| 8,791,790 | B2 | 7/2014 | Robertson |
| 9,053,624 | B2 | 6/2015 | Bentley et al. |
| 9,483,887 | B1 | 11/2016 | Soleimani |
| 9,485,607 | B2 | 11/2016 | Aarnio |
| 9,514,589 | B2 | 12/2016 | Raina et al. |
| 9,589,403 | B2 | 3/2017 | Lingan et al. |
| 2007/0041352 | A1 | 2/2007 | Frankel et al. |
| 2015/0084736 | A1 | 3/2015 | Horton |
| 2015/0172872 | A1 | 6/2015 | Alsehly et al. |
| 2016/0055689 | A1 | 2/2016 | Raina et al. |
| 2016/0122157 | A1 | 5/2016 | Keser |
| 2016/0162980 | A1* | 6/2016 | Oldre ................. G06Q 30/0641 705/27.1 |
| 2017/0122744 | A1 | 5/2017 | Long et al. |
| 2017/0291792 | A1 | 10/2017 | Scoville et al. |
| 2017/0291795 | A1 | 10/2017 | Scoville et al. |
| 2018/0240096 | A1* | 8/2018 | Patel ................... G06Q 20/202 |

FOREIGN PATENT DOCUMENTS

| | | |
|---|---|---|
| CN | 104276462 A | 1/2015 |
| CN | 105366458 A | 3/2016 |
| CN | 106335822 A | 1/2017 |
| EP | 3418235 A1 | 12/2018 |
| EP | 3418236 A1 | 12/2018 |
| JP | 2001206649 A | 7/2001 |
| JP | 2003226473 A | 8/2003 |
| JP | 20153785 A | 1/2015 |
| WO | 20170024102 A1 | 2/2017 |
| WO | 2017175021 A1 | 10/2017 |
| WO | 20170175019 A1 | 10/2017 |
| WO | 20170175021 A1 | 10/2017 |
| WO | 20170175023 A1 | 10/2017 |

OTHER PUBLICATIONS

Chinese Second Office action for application CN 201810634985.1, dated Dec. 13, 2021, 11 pages.

* cited by examiner

PERSONAL MOBILE TERMINAL AND A METHOD OF REQUESTING ELEVATOR SERVICE

FOREIGN PRIORITY

This application claims priority to Chinese Patent Application No. 201810166830.X, filed Feb. 28, 2018, and all the benefits accruing therefrom under 35 U.S.C. § 119, the contents of which in its entirety are herein incorporated by reference.

TECHNICAL FIELD

The present invention belongs to the field of elevator intelligent control technologies, and relates to an automatic elevator service request based on interaction between a wireless signal apparatus and a personal mobile terminal, and in particular, to an automatic elevator call system and a method for requesting an elevator service.

BACKGROUND ART

In an existing elevator system, a common elevator call operation manner is that a passenger manually presses an elevator call button on an elevator call request input device installed in an elevator landing zone to input an up or down elevator call request command, and then enters an elevator car. Such an elevator call request operation manner needs to be completed with a manual operation. Moreover, the elevator call request operation becomes especially difficult when a passenger cannot move the hands freely (for example, the passenger is carrying things with hands or the passenger who has difficulty in walking is sitting on a wheelchair) to press the button, affecting passenger experience.

With the development of automatic elevator call operation technologies, various technologies for automatically implementing an elevator service request operation by using an intelligent mobile terminal such as a mobile phone have emerged. However, passenger experience still needs to be improved continuously.

SUMMARY OF THE INVENTION

According to a first aspect of the present invention, an automatic elevator call system is provided, including: a wireless signal apparatus, installed in an elevator system and broadcasting a corresponding wireless signal around, wherein the automatic elevator call system detects the wireless signal and a signal strength value thereof by using a personal mobile terminal carried by a passenger, and automatically sends an elevator service request command to the wireless signal apparatus when the signal strength value is greater than or equal to a predetermined threshold.

According to an embodiment of the present invention, the automatic elevator call system includes the following units disposed in the personal mobile terminal: a short range communication unit configured to detect the wireless signal that is broadcast by the wireless signal apparatus in the elevator system; a signal strength determining unit configured to determine the signal strength value of the detected wireless signal; and an elevator service request unit configured to automatically send the corresponding elevator service request command to the wireless signal apparatus when the signal strength value is greater than or equal to the predetermined threshold.

According to an embodiment of the present invention, the automatic elevator call system stores, by using the personal mobile terminal, signal strength distribution information of the wireless signal in a corresponding building zone with respect to the wireless signal apparatus.

According to an embodiment of the present invention, in the automatic elevator call system, the elevator service request unit is further configured to roughly determine a position of the personal mobile terminal with respect to the wireless signal apparatus based on the signal strength distribution information.

According to an embodiment of the present invention, in the automatic elevator call system, the elevator service request unit is further configured to roughly determine, based on the signal strength distribution information, a service request triggering position at which the signal strength value is substantially equal to the predetermined threshold, or roughly determine a value of the predetermined threshold based on the signal strength distribution information and an input service request triggering position.

According to an embodiment of the present invention, the automatic elevator call system further includes the following unit disposed in the personal mobile terminal: a setting unit configured to input the corresponding service request triggering position.

According to an embodiment of the present invention, in the automatic elevator call system, the service request triggering position falls in coverage of the wireless signal broadcast by the wireless signal apparatus.

According to an embodiment of the present invention, in the automatic elevator call system, the service request triggering position is represented by a travel distance or a travel time for traveling to the wireless signal apparatus.

According to an embodiment of the present invention, in the automatic elevator call system, the short range communication unit is further configured to continuously scan the wireless signal until the signal strength value of the wireless signal is greater than or equal to the predetermined threshold.

According to an embodiment of the present invention, in the automatic elevator call system, the short range communication unit is further configured to establish a corresponding wireless connection with the wireless signal apparatus when the signal strength value is greater than or equal to the corresponding predetermined threshold, wherein the elevator service request command is transmitted to the wireless signal apparatus via the wireless connection.

According to an embodiment of the present invention, in the automatic elevator call system, the wireless signal apparatus is a Bluetooth module or a Bluetooth Low Energy (BLE) module, and the wireless signal is a Bluetooth signal or a BLE signal.

According to an embodiment of the present invention, in the automatic elevator call system, the wireless signal apparatus includes a first wireless signal apparatus that is installed in an elevator landing zone of the elevator system and configured to broadcast a first wireless signal and receive an elevator service request command representing an elevator call request, wherein the elevator service request command representing the elevator call request is automatically sent by the personal mobile terminal when the signal strength value of the first wireless signal is greater than or equal to a first predetermined threshold.

According to an embodiment of the present invention, in the automatic elevator call system, the wireless signal apparatus includes a second wireless signal apparatus that is installed in an elevator car of the elevator system and configured to broadcast a second wireless signal and receive an elevator service request command representing a destination floor, wherein the elevator service request command representing the destination floor is automatically sent by the personal mobile terminal when the signal strength value of the second wireless signal is greater than or equal to a second predetermined threshold.

According to a second aspect of the present invention, a method for requesting an elevator service is provided, including steps of: detecting a wireless signal broadcast by a wireless signal apparatus in an elevator system; determining a signal strength value of the detected wireless signal; and automatically sending a corresponding elevator service request command to the wireless signal apparatus when the signal strength value is greater than or equal to a predetermined threshold.

According to an embodiment of the present invention, the method for requesting an elevator service further includes a step of: acquiring signal strength distribution information of the wireless signal in a corresponding building zone with respect to the wireless signal apparatus.

According to an embodiment of the present invention, the method for requesting an elevator service further includes a step of: roughly determining a position of a personal mobile terminal, which is configured to detect the wireless signal, with respect to the wireless signal apparatus based on the signal strength distribution information.

According to an embodiment of the present invention, the method for requesting an elevator service further includes a step of: roughly determining, based on the signal strength distribution information, a service request triggering position at which the signal strength value is substantially equal to the predetermined threshold, or roughly determining a value of the predetermined threshold based on the signal strength distribution information and an input service request triggering position.

According to an embodiment of the present invention, the method for requesting an elevator service further includes a step of: inputting a corresponding service request triggering position.

According to an embodiment of the present invention, in the method for requesting an elevator service, the service request triggering position falls in coverage of the wireless signal broadcast by the wireless signal apparatus.

According to an embodiment of the present invention, in the method for requesting an elevator service, the service request triggering position is represented by a travel distance or a travel time for traveling to the wireless signal apparatus.

According to an embodiment of the present invention, in the method for requesting an elevator service, in the step of detecting a wireless signal, the wireless signal is continuously scanned until the signal strength value of the wireless signal is greater than or equal to the predetermined threshold.

According to an embodiment of the present invention, the method for requesting an elevator service further includes a step of: establishing a corresponding wireless connection with the wireless signal apparatus when the signal strength value is greater than or equal to the corresponding predetermined threshold, wherein the elevator service request command is transmitted to the wireless signal apparatus via the wireless connection.

According to an embodiment of the present invention, in the method for requesting an elevator service, the elevator service request command includes an elevator service request command representing an elevator call request and/or an elevator service request command representing a destination floor.

According to a third aspect of the present invention, a computer readable storage medium is provided, the computer readable storage medium storing a computer program, wherein the program can be executed by a processor to implement the steps of any method for requesting an elevator service described above.

According to a fourth aspect of the present invention, an elevator system is provided, including: any automatic elevator call system described above; and an elevator controller configured to control running of one or more elevator cars in the elevator system, wherein the elevator controller is coupled to the wireless signal apparatus and controls the running of the one or more elevator cars in the elevator system in response to at least the elevator call request command.

According to a fifth aspect of the present invention, a personal mobile terminal is provided, including: a short range communication unit configured to detect a wireless signal broadcast by a wireless signal apparatus in an elevator system; a signal strength determining unit configured to determine a signal strength value of the detected wireless signal; and an elevator service request unit configured to automatically send a corresponding elevator service request command to the wireless signal apparatus when the signal strength value is greater than or equal to a predetermined threshold.

According to an embodiment of the present invention, the personal mobile terminal stores signal strength distribution information of the wireless signal in a corresponding building zone with respect to the wireless signal apparatus.

According to an embodiment of the present invention, in the personal mobile terminal, the elevator service request unit is further configured to roughly determine a position of the personal mobile terminal with respect to the wireless signal apparatus based on the signal strength distribution information.

According to an embodiment of the present invention, in the personal mobile terminal, the elevator service request unit is further configured to roughly determine, based on the signal strength distribution information, a service request triggering position at which the signal strength value is substantially equal to the predetermined threshold, or roughly determine a value of the predetermined threshold based on the signal strength distribution information and an input service request triggering position.

According to an embodiment of the present invention, the personal mobile terminal further includes: a setting unit configured to input the corresponding service request triggering position.

According to an embodiment of the present invention, in the personal mobile terminal, the service request triggering position falls in coverage of the wireless signal broadcast by the wireless signal apparatus.

According to an embodiment of the present invention, in the personal mobile terminal, the service request triggering position is represented by a travel distance or a travel time for traveling to the wireless signal apparatus.

According to an embodiment of the present invention, in the personal mobile terminal, the short range communication unit is further configured to continuously scan the wireless signal until the signal strength value of the wireless signal is greater than or equal to the predetermined threshold.

According to an embodiment of the present invention, in the personal mobile terminal, the short range communication unit is further configured to establish a corresponding wireless connection with the wireless signal apparatus when the signal strength value is greater than or equal to the corresponding predetermined threshold, wherein the elevator service request command is transmitted to the wireless signal apparatus via the wireless connection.

According to an embodiment of the present invention, in the personal mobile terminal, the wireless signal apparatus is a Bluetooth module or a BLE module, and the wireless signal is a Bluetooth signal or a BLE signal.

According to an embodiment of the present invention, in the personal mobile terminal, the wireless signal apparatus includes a first wireless signal apparatus that is installed in an elevator landing zone of the elevator system and configured to broadcast a first wireless signal, wherein the elevator service request unit is further configured to automatically send an elevator service request command representing an elevator call request to the first wireless signal apparatus when the signal strength value of the first wireless signal is greater than or equal to a first predetermined threshold.

According to an embodiment of the present invention, in the personal mobile terminal, the wireless signal apparatus includes a second wireless signal apparatus that is installed in an elevator car of the elevator system and configured to broadcast a second wireless signal, wherein the elevator service request unit is further configured to automatically send an elevator service request command representing a destination floor to the second wireless signal apparatus when the signal strength value of the second wireless signal is greater than or equal to a second predetermined threshold.

The foregoing features and operations of the present invention will become more apparent from the following description and the accompanying drawings.

BRIEF DESCRIPTION OF THE DRAWINGS

The following detailed description with reference to the accompanying drawings will make the foregoing and other objectives and advantages of the present invention more complete and clearer, wherein identical or similar elements are denoted by using identical reference numerals.

DETAILED DESCRIPTION

The present invention is now described more thoroughly with reference to the accompanying drawings. The drawings show exemplary embodiments of the present invention. However, the present invention can be implemented according to many different forms, and should not be construed as being limited by the embodiments illustrated herein. On the contrary, these embodiments are provided to make the present disclosure thorough and complete, and fully convey the idea of the present invention to those skilled in the art.

Some block diagrams shown in the accompanying drawings are functional entities, which do not necessarily correspond to physically or logically independent entities. The functional entities can be implemented in a software form, or implemented in one or more hardware modules or integrated circuits, or implemented in different processing apparatuses and/or micro control apparatuses.

Figure 1:
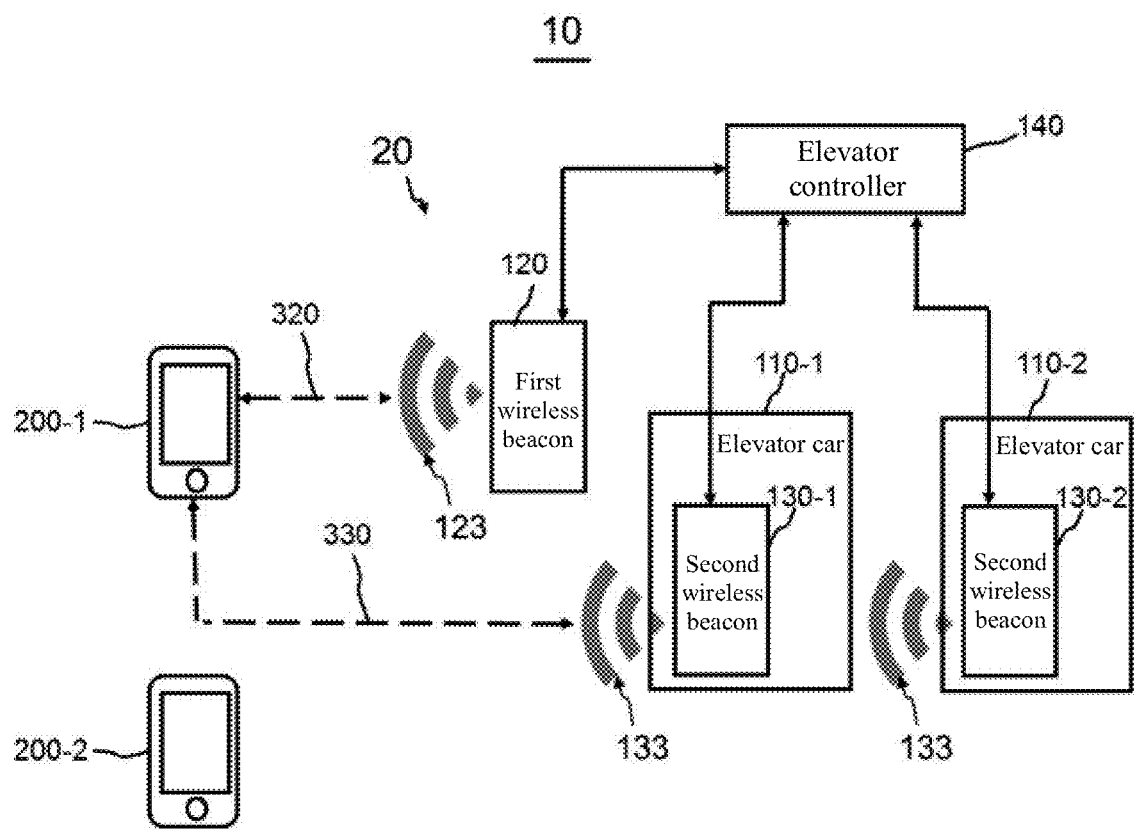
FIG. 1 is a schematic diagram of an elevator system according to an embodiment of the present invention, in which an automatic elevator call system according to an embodiment of the present invention is used.
Figure 2:
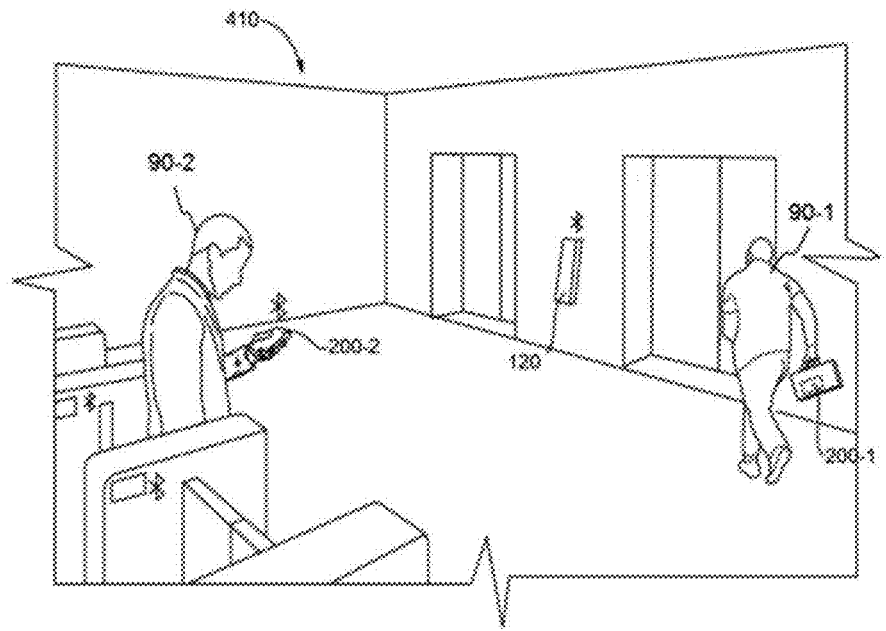
FIG. 2 is a schematic diagram of an application scenario of an elevator system according to an embodiment of the present invention.
Figure 3:
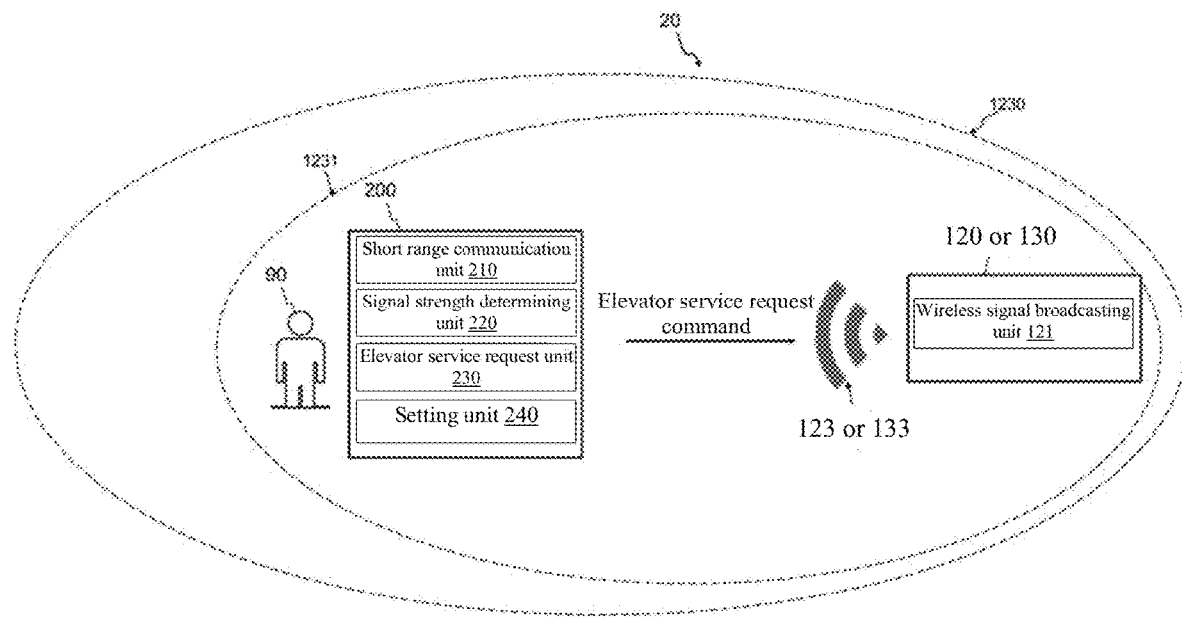
FIG. 3 is a schematic diagram of an automatic elevator call system according to an embodiment of the present invention.

FIG. 1 is a schematic diagram of an elevator system according to an embodiment of the present invention. FIG. 2 is a schematic diagram of an application scenario of an elevator system according to an embodiment of the present invention. FIG. 3 is a schematic diagram of an automatic elevator call system according to an embodiment of the present invention, which includes a wireless signal apparatus according to an embodiment of the present invention. An elevator system 10, an automatic elevator call system 20 and a personal mobile terminal 200 according to an embodiment of the present invention are illustrated in detail below with reference to FIG. 1, FIG. 2 and FIG. 3.

The elevator system 10 according to the embodiment of the present invention can be installed in various buildings. The elevator system 10 includes multiple elevator cars 110 that travel vertically in a hoistway of a building. FIG. 1 shows two elevator cars: elevator cars 110-1 and 110-2. Each elevator car 110 is under the control (such as scheduling control and travel control) of an elevator controller 140 in the elevator system 10, so as to travel in the hoistway or stop at the corresponding landing. Generally, the elevator controller 140 needs to acquire elevator service request commands (such as an elevator service request command representing an elevator call request, i.e., an elevator call request command) from elevator landing zones 410 of various floors, thus performing operational control on the elevator based on the commands, for example, performing scheduling control on the elevator cars 110. It will be appreciated that the specific control manner or control principle based on which the elevator controller 140 controls the one or more elevator cars 110 is not limited, and the specific structure, arrangement manner or the like of the elevator controller 140 is not limited either.

In order to acquire the elevator call request command from each elevator landing zone 410, a first wireless signal apparatus 120 is disposed in the automatic elevator call system 20 of the elevator system 10. The first wireless signal apparatus 120 can be a beacon that broadcasts a particular type of wireless signal, and can be installed in each elevator landing zone 410 of the elevator system 10 (as shown in FIG. 2). For example, at least one first wireless signal apparatus 120 is installed in the elevator landing zone 410 of each floor, so that first wireless signals 123 sent out or broadcast by the first wireless signal apparatuses 120 can effectively cover each elevator landing zone 410 approximately, thus forming corresponding coverage. It should be noted that the strength of the first wireless signal 123 broadcast by the first wireless signal apparatus 120 attenuates with its propagation distance. A specific attenuation manner is not limited.

Further as shown in FIG. 1 and FIG. 3, the automatic elevator call system 20 of the elevator system 10 further includes one or more second wireless signal apparatuses 130 (such as second wireless signal apparatuses 130-1 and 130-2). The second wireless signal apparatus 130 can be a beacon that broadcasts a particular type of wireless signal. Each second wireless signal apparatus 130 is installed in a corresponding elevator car 110. For example, the elevator car 110-1 is provided with a second wireless signal apparatus 130-1, and the elevator car 110-2 is provided with a second wireless signal apparatus 130-2. In an embodiment, the second wireless signal apparatus 130 is installed on a destination floor registration control panel in the elevator car 110 and is integrated on the destination floor registration control panel. An installation manner of the second wireless signal apparatus 130 with respect to the elevator car 110 is not limited to the foregoing example.

The second wireless signal apparatus 130 can transmit or broadcast a second wireless signal 133, for example, broadcast the second wireless signal 133 continuously (e.g., at short time intervals). The signal strength of the broadcast second wireless signal 133 attenuates with its propagation distance. A specific attenuation manner is not limited. The second wireless signal 133 broadcast by the second wireless signal apparatus 130 can effectively cover a region in the elevator car 110 where it is installed approximately, thus forming corresponding coverage.

It should be noted that the second wireless signal apparatus 130 is coupled with the elevator controller 140. Therefore, in a running process of each elevator car 110, the second wireless signal apparatus 130 can acquire, from the elevator controller 140 in real time, desired information such as current floor information and travel direction information of the elevator car 110, package the floor information and/or travel direction information (the travel direction information includes, for example, "up", "down", and "stop") into a Bluetooth data signal or the like, and broadcast the Bluetooth data signal in the form of the second wireless signal.

In an embodiment, the first wireless signal apparatus 120 and/or the second wireless signal apparatus 130 can be a Bluetooth module, and can specifically be a BLE module. Correspondingly, the first wireless signal 123 transmitted or broadcast by the first wireless signal apparatus 120 and/or the second wireless signal 133 transmitted or broadcast by the second wireless signal apparatus 130 can be a Bluetooth signal (such as a BLE signal).

In an embodiment, the first wireless signal 123 (for example, the BLE signal) can include a wakeup signal for waking up the personal mobile terminal 200. The personal mobile terminal 200 that detects the wakeup signal can wake up a corresponding application component (such as an automatic elevator call APP) of the personal mobile terminal 200 to work. Specifically, the first wireless signal 123 can further include a data signal reflecting a universally unique identifier (UUID) of the first wireless signal apparatus 120 and/or information about a floor position of the first wireless signal apparatus 120. The second wireless signal 133 can further include a data signal reflecting a universally unique identifier (UUID) of the second wireless signal apparatus 130 and/or information about a floor position of the second wireless signal apparatus 130.

Further as shown in FIG. 1 to FIG. 3, the automatic elevator call system 20 of the elevator system 10 can interact with the personal mobile terminal 200 carried by a passenger 90, for example, interact with personal mobile terminals 200-1 and 200-2 carried by two passengers respectively, thus completing an elevator call request. Each personal mobile terminal 200 is configured to be capable of detecting the wireless signal broadcast by the wireless signal apparatus in the elevator system 10, for example, detecting the first wireless signal 123 broadcast by the first wireless signal apparatus 120 and the second wireless signal 133 broadcast by the second wireless signal apparatus 130, when a distance condition is met. Moreover, in an embodiment, each personal mobile terminal 200 can automatically send a corresponding elevator service request command to the wireless signal apparatus in the elevator system 10 when a corresponding condition is met. The specific condition and sending of the elevator service request command will be illustrated in the following.

In an embodiment, as shown in FIG. 3, a wireless signal broadcasting unit 121 is disposed in the first wireless signal apparatus 120 or the second wireless signal apparatus 130, and is configured to broadcast the first wireless signal 123 or the second wireless signal 133, for example, broadcast a wireless signal having particular signal strength or directionally broadcast a wireless signal having particular signal strength, so that the first wireless signal 123 or the second wireless signal 133 can cover a predetermined range respectively (i.e., coverage 1230). The coverage 1230 is, for example, a range in which the personal mobile terminal is capable of detecting the first wireless signal 123 or the second wireless signal 133 (for example, coverage in which the signal strength is greater than or equal to 0 approximately). Therefore, the coverage may be related to a signal detecting capability of each personal mobile terminal 200. Generally, the boundary of the coverage 1230 (the larger dashed box shown in FIG. 3) can be known in advance by test.

It will be appreciated that the coverage 1230 of the first wireless signal 123 broadcast by the first wireless signal apparatus 120 may be different from the coverage 1230 of the second wireless signal 133 broadcast by the second wireless signal apparatus 130. First wireless signals 123 broadcast by different first wireless signal apparatuses 120 can also have different coverage 1230. For example, the setting of the wireless signal broadcasting unit 121 can be adjusted according to the structure of a local zone in the building (such as the structure of the elevator landing zone), thus setting the coverage 1230 of the first wireless signal 123.

It will be appreciated that the shape of the coverage 1230 of the wireless signal shown in FIG. 3 is merely an example of a regular shape. In practice, the shape of the coverage 1230 may be irregular, but can be known in advance by test.

Correspondingly, in the embodiment shown in FIG. 3, each personal mobile terminal 200 detects the first wireless signal 123 or the second wireless signal 133 by using a short range communication unit 210 disposed in the personal mobile terminal 200. For example, the first wireless signal 123 or the second wireless signal 133 is detected by means of scanning. As such, each personal mobile terminal 200 has a capability of proactively detecting and receiving the wireless signal broadcast by the wireless signal apparatus of the elevator system 10.

Correspondingly, in the embodiment shown in FIG. 3, a signal strength determining unit 220 can be specifically disposed in each personal mobile terminal 200. The signal strength determining unit 220 can determine a signal strength value of the first wireless signal 123 or the second wireless signal 133 according to the first wireless signal 123 or the second wireless signal 133 detected by the short range communication unit 210, for example, determine a signal strength value of a detected BLE signal. The signal strength determining unit 220 can be specifically implemented, for example, by a received signal strength indicator (RSSI). The signal strength value can be represented, for example, by using dBm.

Since the first wireless signal 123 or the second wireless signal 133 attenuates with its propagation distance, in an embodiment, the signal strength determining unit 220 of the personal mobile terminal 200 can be used to detect the first wireless signal 123 or the second wireless signal 133 at a predetermined position in advance and determine the signal strength value of the first wireless signal 123 or the second wireless signal 133, so as to obtain signal strength distribution information of the first wireless signal 123 or the second wireless signal 133 in a corresponding building zone (such as in the elevator landing zone 410 or the elevator car 110). Specifically, the expression form of the signal strength distribution information may not be limited to a graph or a table. Each personal mobile terminal 200 can pre-store the acquired signal strength distribution information by means of downloading in advance or the like. For example, the signal strength distribution information is stored in an elevator service request unit 230 or stored in a corresponding memory.

In an embodiment, as shown in FIG. 3, an elevator service request unit 230 is further disposed in each personal mobile terminal 200. The elevator service request unit 230 is configured to automatically send a corresponding elevator service request command to the wireless signal apparatus in the elevator system 10 when the signal strength value is greater than or equal to a corresponding predetermined threshold. It should be noted that the predetermined threshold can be determined in advance, for example, determined by user input or determined by means of statistics. The predetermined threshold can vary for different passengers; the predetermined threshold can also vary for different wireless signal apparatuses (for example, first wireless signal apparatuses 120 of different elevator landing zones). Since the first wireless signal 123 or the second wireless signal 133 has the characteristic of attenuating with its propagation distance, the foregoing predetermined threshold can correspond to a corresponding service request triggering position. In other words, when the personal mobile terminal 200 of the passenger 90 is at the service request triggering position, the signal strength value of the wireless signal detected by the personal mobile terminal 200 is substantially equal to the foregoing predetermined threshold. For ease of description and comprehension, FIG. 3 and FIG. 4 further show a range 1231. The range 1231 is correspondingly a service request range 1231, and a position corresponding to the dashed-line boundary of the service request range 1231 is approximately the service request triggering position.

Generally, the predetermined threshold is greater than 0. Therefore, the area of the service request range 1231 is smaller than the coverage 1230 of the wireless signal, that is, the boundary of the service request range 1231 (the service request triggering position) falls in the coverage 1230. A distance $\Delta d1$ between the boundary of the service request range 1231 and the boundary of the coverage 1230 is related to the value of the predetermined threshold. The smaller the predetermined threshold is, the smaller the $\Delta d1$ is.

In an embodiment, the elevator service request unit 230 is further configured to roughly determine a position of the personal mobile terminal 200 with respect to the first wireless signal apparatus 120 or the second wireless signal apparatus 130 based on the foregoing signal strength distribution information. For example, the signal strength determining unit 220 of the personal mobile terminal 200 determines a signal strength value of the detected first wireless signal 123 or the second wireless signal 133, and can roughly determine, based on the signal strength value and the signal strength distribution information, current position information of the personal mobile terminal 200 with respect to the first wireless signal apparatus 120 or the second wireless signal apparatus 130, for example, an approximate distance to the first wireless signal apparatus 120 or the second wireless signal apparatus 130. The position information can be presented by a display component of the personal mobile terminal 200, so that the passenger 90 can have a basic idea of his/her position information.

In an embodiment, the elevator service request unit 230 is further configured to roughly determine, based on the foregoing signal strength distribution information and the position of the personal mobile terminal 200 with respect to the first wireless signal apparatus 120 or the second wireless signal apparatus 130, the signal strength value of the wireless signal that can be detected by the personal mobile terminal 200 at this position. The position of the personal mobile terminal 200 with respect to the first wireless signal apparatus 120 or the second wireless signal apparatus 130 can be, for example, distance information, and can be acquired based on an input of the passenger.

In an embodiment, the elevator service request unit 230 is further configured to roughly determine, based on the signal strength distribution information, a service request triggering position at which the signal strength value is substantially equal to the predetermined threshold. That is, the service request triggering position at which the signal strength value is substantially equal to the predetermined threshold can be determined by the elevator service request unit 230. For example, the service request triggering position, i.e., the boundary of the service request range 1231, is already determined in FIG. 3 and FIG. 4. Therefore, the boundary of the current service request range 1231 can be presented to the passenger 90 by using the display component of the personal mobile apparatus 200, so that the passenger 90 can conveniently adjust the setting as required. Once the passenger 90 travels to the service request triggering position from the external, the elevator service request unit 230 will be triggered to generate an elevator service request command. For the first wireless signal apparatus 120 and the second wireless signal apparatus 130, the service request triggering position can be different and can be stored in the personal mobile terminal 200. Therefore, in an embodiment, once the position of the personal mobile terminal 200 with respect to the first wireless signal apparatus 120 and the second wireless signal apparatus 130 is equal to or near the service request triggering position, the elevator service request unit 230 is automatically triggered to send the corresponding elevator service request command.

The elevator service request command can include an elevator service request command representing an elevator call request (i.e., an elevator call request command) and an elevator service request command representing a destination floor (i.e., a destination floor registration command) Corresponding to the first wireless signal apparatus 120, the elevator service request unit 230 generates and sends the elevator call request command when the condition in the foregoing example is met. Corresponding to the second wireless signal apparatus 130, the elevator service request unit 230 generates and sends the destination floor registration command when the condition in the foregoing example is met.

In an embodiment, as shown in FIG. 3, a setting unit 240 is further disposed in each personal mobile terminal 200. The setting unit 240 is configured to input a corresponding service request triggering position. As such, the passenger 90 can conveniently input a desired service request triggering position. The service request triggering position reflects the value of the predetermined threshold, that is, reflects a trigger condition of an elevator service request, so that the passenger 90 can understand the position more intuitively and easily, and can input the service request triggering position more accurately. It will be appreciated that in other embodiments, the setting unit 240 can also be used to input a predetermined threshold. However, it is probably difficult for the passenger 90 to quantitatively understand the value of the predetermined threshold of the signal strength, resulting in relatively poor use experience, and the setting of the predetermined threshold probably cannot reflect the requirement of the passenger 90 reasonably. In an embodiment, the service request triggering position can be represented by using a travel distance (such as 10-20 m) for traveling to the wireless signal apparatus, for example, a travel distance (which is not necessarily a straight-line distance) for the passenger 90 to travel to the first wireless signal apparatus 120. In another alternative embodiment, the service request triggering position can be represented by using a travel time (such as 10-30 s) for traveling to the wireless signal apparatus. When the service request triggering position is represented by using the travel time, the personal mobile terminal 200 can acquire a travel speed of the passenger 90 in advance, so as to roughly calculate a travel distance. It should be noted that a propagation distance of the wireless signal can be roughly calculated based on the travel distance according to the structure of the building zone, thus obtaining the corresponding service request triggering position.

In an embodiment, the short range communication unit 210 disposed in the personal mobile terminal 200 is further configured to continuously scan the first wireless signal 123 or the second wireless signal 133 until the signal strength value of the first wireless signal 123 or the second wireless signal 133 is greater than or equal to a first predetermined threshold or a second predetermined threshold. Definitely, it will be appreciated that after the signal strength value is greater than or equal to the first predetermined threshold or the second predetermined threshold, the short range communication unit 210 can still continue to scan the first wireless signal 123 or the second wireless signal 133 as required. It should be noted that both the first predetermined threshold and the second predetermined threshold are different manifestations of the predetermined threshold, e.g., they have different values respectively. The first predetermined threshold and the second predetermined threshold are predetermined thresholds corresponding to the first wireless signal 123 and the second wireless signal 133 respectively.

In an embodiment, the short range communication unit 210 of the personal mobile terminal 200 is further configured to establish a corresponding wireless connection with the corresponding wireless signal apparatus when the determined signal strength value is greater than or equal to the predetermined threshold. The elevator service request command is transmitted to the corresponding wireless signal apparatus via the established wireless connection. For example, when the signal strength value of the received first wireless signal 123 is greater than or equal to the first predetermined threshold, a corresponding wireless connection 320 with the first wireless signal apparatus 120 is established (as shown in FIG. 1), and the elevator call request command is transmitted to the first wireless signal apparatus 120 via the wireless connection 320. When the signal strength value of the received second wireless signal 133 is greater than or equal to the second predetermined threshold, a corresponding wireless connection 330 with the second wireless signal apparatus 130 is established (as shown in FIG. 1), and the destination floor registration command is transmitted to the second wireless signal apparatus 130 via the wireless connection 330. The wireless connection 320 or 330 can specifically be a Bluetooth connection or a BLE connection. After the wireless connection 320 or 330 corresponding to a certain personal mobile terminal 200 is established and corresponding information is transmitted, the wireless connection 320 or 330 can be disrupted immediately, so that the wireless signal apparatus can establish wireless connections with other personal mobile terminals 200 in sequence.

Figure 4:
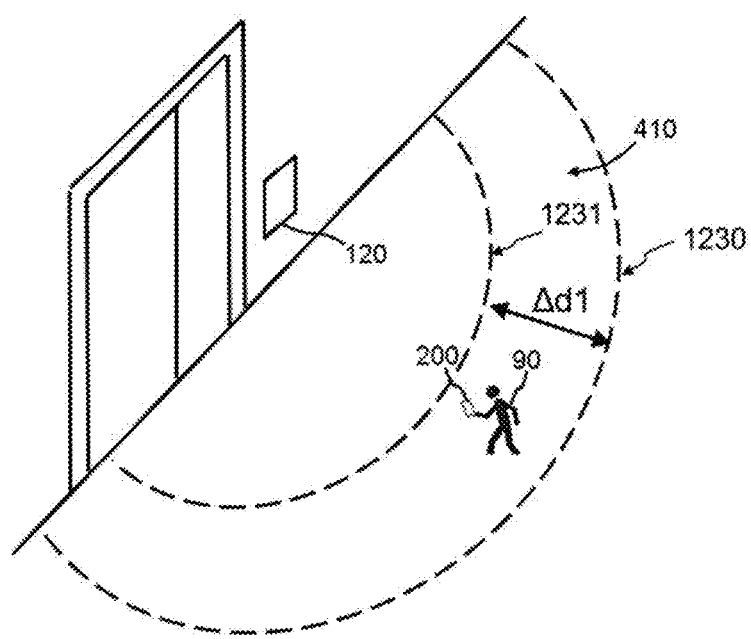
FIG. 4 is a schematic diagram of an application scenario of a personal mobile terminal according to an embodiment of the present invention.

How to implement automatic elevator call by using the personal mobile terminal 200 according to the embodiment of the present invention and an automatic elevator call system according to an embodiment of the present invention are illustrated in the following based on an application scenario shown in FIG. 4. FIG. 4 schematically shows the coverage 1230 of the wireless signal 123 broadcast by the first wireless signal apparatus 120 and the service request range 1231 that is virtually preset in the personal mobile terminal 200. The service request range 1231 is determined based on the value of the predetermined threshold and can be preset by the passenger 90. If wanting to take the elevator, the passenger 90 travels towards the elevator landing zone 410. When the passenger 90 reaches the boundary of the coverage 1230, the personal mobile terminal 200 will be capable of detecting the presence of the first wireless signal 123. In this case, based on the detection, the personal mobile terminal 200 can automatically trigger a desired application component (such as an APP) to run. Meanwhile, the personal mobile terminal 200 continuously monitors the signal strength value of the received first wireless signal 123. When the passenger 90 gets closer to the first wireless signal apparatus 120 installed in the elevator landing zone 410, the signal strength value will, for example, increase roughly. Once the signal strength value is greater than or equal to the first predetermined threshold, that is, when the passenger 90 walks to the boundary or a position inside the service request range 1231, the personal mobile terminal 200 will be capable of automatically generating a corresponding elevator call request command, and automatically sending the elevator call request command to the first wireless signal apparatus 120 via the established wireless connection 320.

Compared with the manner of judging whether to trigger an elevator service request based on whether a wireless signal is detected or whether the passenger enters the coverage 1230, the foregoing manner of judging whether to trigger an elevator service request based on the predetermined threshold or the service request range 1231 can effectively avoid problems caused by excessively large coverage 1230, for example, a problem caused by sending the elevator service request too early (if the elevator service request is sent too early, the passenger 90 may be unable to enter a scheduled elevator car in time). Moreover, setting of the coverage 1230 and setting of the predetermined threshold or the service request range 1231 can be performed independently, thus not only ensuring the coverage 1230 to be large enough and good coverage of the wireless signal, but also ensuring the elevator service request to be sent at a reasonable time. Moreover, the existence of the predetermined threshold or the service request range 1231 makes it possible for each passenger 90 to individually set a desired service request sending time point or the service request triggering position based on a personal condition (such as a physical condition or a walking speed) or a personal requirement, which helps improve elevator call experience of each passenger 90.

It will be appreciated that the foregoing application scenario shown in FIG. 4 can also be applied to the second wireless signal apparatus 130 in the elevator car 110. As such, when the passenger 90 carrying the personal mobile terminal 200 walks to the boundary of or a position inside the service request range 1231, the personal mobile terminal 200 will be capable of automatically generating a corresponding destination floor registration command and automatically sending the destination floor registration command to the second wireless signal apparatus 130 via the established wireless connection 330, thus achieving similar advantages. It is also possible to achieve the following advantage: even if the coverage 1230 of the second wireless signal 133 of the second wireless signal apparatus 130 is large enough, for example, the personal mobile terminal 200 in the elevator landing zone 410 can also detect the second wireless signal 133 when the floor door of the elevator car 110 opens, the personal mobile terminal 200 in the elevator landing zone 410 will not send the destination floor registration command mistakenly so long as the signal strength value of the detected second wireless signal 133 is not greater than or equal to the second predetermined threshold. It will be appreciated that the service request range 1231 can be roughly determined based on the space of the elevator car 110 in which the second wireless signal apparatus 130 is installed, so that the automatic sending of the destination floor registration command is more accurate.

It should be noted that the personal mobile terminal 200 in the foregoing embodiment is not limited to be applied in the foregoing elevator system 10 or automatic elevator call system 20 that supports hand-free elevator call operations in the foregoing embodiment. For example, in another alternative embodiment, the personal mobile terminal 200 can also be applied to the elevator system 10 or automatic elevator call system 20 using the second wireless signal apparatus 130. In this case, the elevator service request command that is sent by the personal mobile terminal 200 to the first wireless signal apparatus 120 when the signal strength value of the detected first wireless signal 123 is greater than or equal to the predetermined threshold includes both the elevator call request command and the destination floor registration command.

Figure 5:
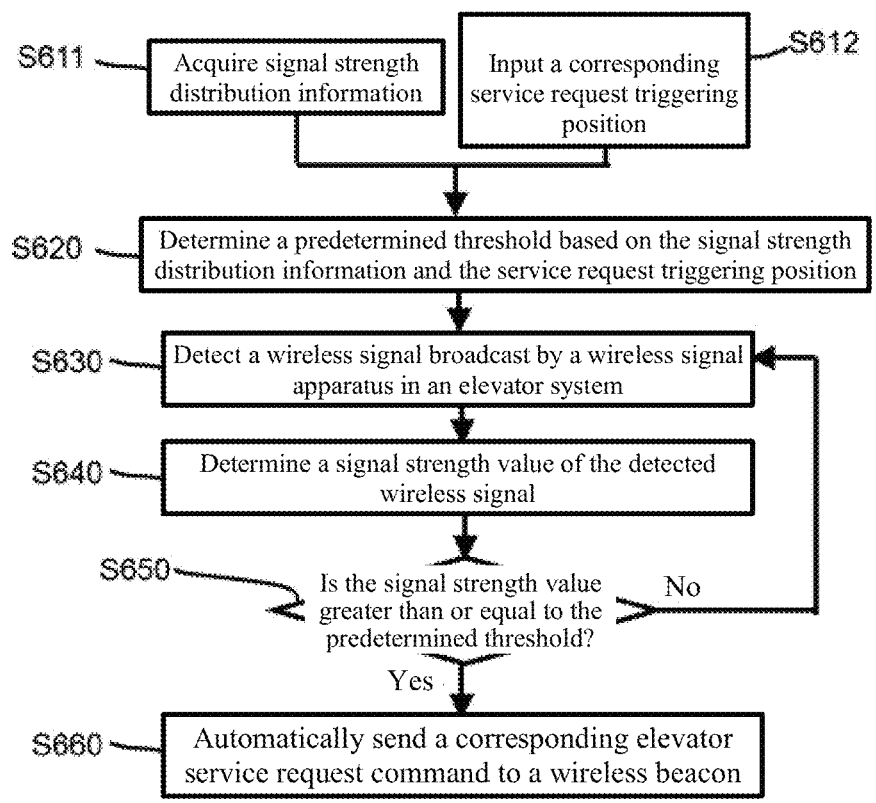
FIG. 5 is a flowchart of a method for requesting an elevator service according to an embodiment of the present invention.

FIG. 5 is a flowchart of a method for requesting an elevator service according to an embodiment of the present invention. The method for requesting an elevator service according to the embodiment of the present invention will be illustrated below with reference to FIG. 3 to FIG. 5.

First, steps S611, S612 and S620 illustrate a preparation process in the method for requesting an elevator service.

Step S611: Signal strength distribution information of a wireless signal in a corresponding building zone with respect to a wireless signal apparatus is acquired. In this step, signal strength values of various positions in a corresponding building zone (such as the elevator landing zone 410) can be detected in advance by using, for example, personal mobile terminals 200, thus forming signal strength distribution information in the building zone. During installation and commissioning, wireless signal apparatuses in different building zones can perform detection separately to obtain respective signal strength distribution information. The obtained signal strength distribution information can be shared by a lot of personal mobile terminals 200, and can be acquired by downloading or other means.

Step S612: A corresponding service request triggering position is input. Each passenger 90 can input a corresponding service request triggering position according to his/her personalized requirement. The service request triggering position can be represented by using a travel distance or a travel time for traveling to the wireless signal apparatus (such as the first wireless signal apparatus 120). As such, the passenger 90 can easily control the accuracy of the input service request triggering position, and good experience is achieved. Generally, the service request triggering position falls in the coverage 1230 of a wireless signal broadcast by the wireless signal apparatus (such as the first wireless signal apparatus 120).

In another alternative embodiment, it is also possible to roughly determine a service request triggering position at which a signal strength value is substantially equal to a predetermined threshold based on the signal strength distribution information, so that the current service request triggering position corresponding to the current predetermined threshold is displayed to the passenger 90, and the passenger adjusts the setting of the service request triggering position based on the displayed current service request triggering position.

Step S620: A predetermined threshold is determined based on the signal strength distribution information and the service request triggering position. In this step, calculation can be performed based on the acquired signal strength distribution information and the input service request triggering position to determine a predetermined threshold corresponding to the input service request triggering position. If multiple service request triggering positions are input at the same time, for example, multiple predetermined thresholds can be calculated and then a mean thereof is taken to serve as the predetermined threshold. In this step, the personalized service request triggering position input by the passenger 90 can be correspondingly converted into a corresponding predetermined threshold, thus facilitating the subsequent comparison and judgment process of the predetermined threshold.

It should be noted that step S612 and step S620 may be performed repeatedly, so that the passenger 90 can set a desired service request triggering position multiple times.

The method for requesting an elevator service further includes the following steps:

Step S630: A wireless signal broadcast by a wireless signal apparatus in an elevator system is detected. For example, as shown in FIG. 4, the short range communication unit 210 of the personal mobile terminal 200 is incapable of detecting the first wireless signal 123 before the passenger 90 enters the coverage 1230, and is capable of detecting the first wireless signal 123 continuously after the passenger 90 enters the coverage 1230. The second wireless signal 133 can also be detected in the same manner.

Step S640: A signal strength value of the detected wireless signal is determined. In this step, changes in the signal strength value of the wireless signal can be monitored continuously by using the signal strength determining unit 220 of the personal mobile terminal 200 shown in FIG. 3.

Step S650: It is judged whether signal strength value is greater than or equal to the predetermined threshold. In this step, judgment can be made by comparing the signal strength value of the first wireless signal 123 with the first predetermined threshold and comparing the signal strength value of the detected second wireless signal 133 with the second predetermined threshold. The two comparisons can be performed independently.

If the judgment result is "no", it indicates that the passenger 90 has not yet entered the service request range 1231 shown in FIG. 4. In this case, sending of an elevator service request command is not triggered, and the process returns to step S630 to continuously scan the wireless signal until the signal strength value of the wireless signal is greater than or equal to the predetermined threshold.

If the judgment result is "yes", it indicates that the passenger 90 enters the service request range 1231 shown in FIG. 4. In this case, sending of an elevator service request command is triggered. That is, step S660 is performed to automatically send a corresponding elevator service request command to the wireless signal apparatus.

In step S660, the personal mobile terminal 200 can be further capable of automatically generating a corresponding elevator call request command and establishing a corresponding wireless connection, wherein the elevator service request command is transmitted to a corresponding wireless signal apparatus via the wireless connection. In an embodiment, a corresponding elevator call request command is generated and a wireless connection 320 to the first wireless signal apparatus 120 is established, and the elevator call request command is transmitted to the first wireless signal apparatus 120 via the wireless connection 320. The personal mobile terminal 200 can also generate a corresponding destination floor registration command, establish a wireless connection 330 with the second wireless signal apparatus 130, and transmit the destination floor registration command to the second wireless signal apparatus 130 via the wireless connection 330.

So far, one elevator service request process is basically completed through steps S630 to S660. It will be appreciated that steps S630 to S660 can be repeated ceaselessly. Moreover, after receiving the elevator service request command, the elevator system 10 will perform scheduling to arrange a corresponding elevator car 110.

It should be noted that the personal mobile terminal 200 in the above embodiment of the present invention can be implemented by using computer program instructions, e.g., implemented by a specific APP. These computer program instructions may be provided to a processor of a general-purpose computer, a special-purpose computer, or another programmable data processing device to form the personal mobile terminal 200 in the embodiment of the present invention. Moreover, the processor of the computer or another programmable data processing device may execute these instructions to create units or components for implementing functions/operations designated in the flowcharts and/or blocks and/or one or more of the flowchart blocks.

Moreover, these computer program instructions may be stored in a computer readable memory. These instructions can instruct the computer or another programmable processor to implement the functions in specific manners, such that these instructions stored in the computer readable memory construct a product including instruction components for implementing functions/operations specified in one or more blocks of the flowcharts and/or block diagrams.

It should be further noted that in some alternative implementations, the functions/operations shown in the blocks may not take place according to the sequence shown in the flowchart. For example, two blocks shown sequentially may be performed substantially at the same time, or these blocks sometimes may be performed in a reversed order, which specifically depends on the functions/operations involved.

It should be noted that elements (including the flowcharts and block diagrams in the accompanying drawings) disclosed and depicted in this specification refer to logic boundaries between elements. However, according to software or hardware engineering practices, the depicted elements and functions thereof can be executed on a machine by using a computer executable medium. The computer executable medium has a processor that can execute a program instruction stored thereon. The program instruction serves as a single-chip software structure, an independent software module, or a module using an external program, code, service or the like, or any combination thereof. Moreover, all these execution solutions may fall within the scope of the present disclosure.

Although different non-limitative implementation solutions have components that are specifically illustrated, the implementation solutions of the present invention are not limited to these specific combinations. Some of the components or features from any non-limitative implementation solution may be combined with features or components from any other non-limitative implementation solution.

Although specific step sequences are shown, disclosed and required, it should be understood that the steps may be implemented in any sequence, separated, or combined, and they will still benefit from the present disclosure unless otherwise specified.

The foregoing descriptions are exemplary and are not defined to be limitative. Various non-limitative implementation solutions are disclosed in this specification; however, according to the foregoing teaching, those of ordinary skill in the art will be aware that various modifications and variations will fall within the scope of the appended claims. Therefore, it should be understood that disclosure content other than those specifically disclosed can be implemented within the scope of the appended claims. Therefore, the appended claims should be read up to determine the real scope and content.

What is claimed is:

1. An automatic elevator call system, comprising:
a wireless signal apparatus, installed in an elevator system and broadcasting a corresponding wireless signal around,
wherein the automatic elevator call system detects the wireless signal and a signal strength value thereof by using a personal mobile terminal carried by a passenger, and automatically sends an elevator service request command to the wireless signal apparatus when the signal strength value is greater than or equal to a predetermined threshold;
wherein the automatic elevator call system stores, by using the personal mobile terminal, signal strength distribution information of the wireless signal in a corresponding building zone with respect to the wireless signal apparatus;
wherein the elevator service request unit is further configured to roughly determine, based on the signal strength distribution information, a service request triggering position at which the signal strength value is substantially equal to the predetermined threshold, or roughly determine a value of the predetermined threshold based on the signal strength distribution information and an input service request triggering position.

2. The automatic elevator call system according to claim 1, wherein the automatic elevator call system comprises the following units disposed in the personal mobile terminal: a short range communication unit configured to detect the wireless signal that is broadcast by the wireless signal apparatus in the elevator system;
a signal strength determining unit configured to determine the signal strength value of the detected wireless signal; and
an elevator service request unit configured to automatically send the corresponding elevator service request command to the wireless signal apparatus when the signal strength value is greater than or equal to the predetermined threshold.

3. The automatic elevator call system according to claim 2, wherein the short range communication unit is further configured to continuously scan the wireless signal until the signal strength value of the wireless signal is greater than or equal to the predetermined threshold.

4. The automatic elevator call system according to claim 2, wherein the short range communication unit is further configured to establish a corresponding wireless connection with the wireless signal apparatus when the signal strength value is greater than or equal to the corresponding predetermined threshold, wherein the elevator service request command is transmitted to the wireless signal apparatus via the wireless connection.

5. The automatic elevator call system according to claim 1, wherein the elevator service request unit is further configured to roughly determine a position of the personal mobile terminal with respect to the wireless signal apparatus based on the signal strength distribution information.

6. The automatic elevator call system according to claim 1, further comprising the following unit disposed in the personal mobile terminal:
a setting unit configured to input the corresponding service request triggering position.

7. The automatic elevator call system according to claim 1, wherein the service request triggering position falls in coverage of the wireless signal broadcast by the wireless signal apparatus.

8. The automatic elevator call system according to claim 1, wherein the service request triggering position is represented by a travel distance or a travel time for traveling to the wireless signal apparatus.

9. The automatic elevator call system according to claim 1, wherein the wireless signal apparatus is a Bluetooth module or a Bluetooth Low Energy (BLE) module, and the wireless signal is a Bluetooth signal or a BLE signal.

10. The automatic elevator call system according to claim 1, wherein the wireless signal apparatus comprises a first wireless signal apparatus that is installed in an elevator landing zone of the elevator system and configured to broadcast a first wireless signal and receive an elevator service request command representing an elevator call request,
wherein the elevator service request command representing the elevator call request is automatically sent by the personal mobile terminal when the signal strength value of the first wireless signal is greater than or equal to a first predetermined threshold.

11. The automatic elevator call system according to claim 1, wherein the wireless signal apparatus comprises a second wireless signal apparatus that is installed in an elevator car of the elevator system and configured to broadcast a second wireless signal and receive an elevator service request command representing a destination floor,
wherein the elevator service request command representing the destination floor is automatically sent by the personal mobile terminal when the signal strength value of the second wireless signal is greater than or equal to a second predetermined threshold.

12. An elevator system, comprising:
the automatic elevator call system according to any of claim 1; and
an elevator controller configured to control running of one or more elevator cars in the elevator system,
wherein the elevator controller is coupled to the wireless signal apparatus and controls the running of the one or more elevator cars in the elevator system in response to at least the elevator call request command.

13. A method for requesting an elevator service, comprising steps of:
detecting a wireless signal broadcast by a wireless signal apparatus in an elevator system;
determining a signal strength value of the detected wireless signal; and
automatically sending a corresponding elevator service request command to the wireless signal apparatus when the signal strength value is greater than or equal to a predetermined threshold;
acquiring signal strength distribution information of the wireless signal in a corresponding building zone with respect to the wireless signal apparatus;
roughly determining, based on the signal strength distribution information, a service request triggering position at which the signal strength value is substantially equal to the predetermined threshold, or roughly determining a value of the predetermined threshold based on the signal strength distribution information and an input service request triggering position.

14. The method according to claim 13, further comprising a step of:
roughly determining a position of a personal mobile terminal, which is configured to detect the wireless signal, with respect to the wireless signal apparatus based on the signal strength distribution information.

15. The method according to claim 13, further comprising a step of: inputting a corresponding service request triggering position.

16. The method according to claim 13, wherein the service request triggering position falls in coverage of the wireless signal broadcast by the wireless signal apparatus.

17. The method according to claim 13, wherein the service request triggering position is represented by a travel distance or a travel time for traveling to the wireless signal apparatus.

18. The method according to claim 13, wherein in the step of detecting a wireless signal, the wireless signal is continuously scanned until the signal strength value of the wireless signal is greater than or equal to the predetermined threshold.

19. The method according to claim 13, further comprising a step of:
establishing a corresponding wireless connection with the wireless signal apparatus when the signal strength value is greater than or equal to the corresponding predetermined threshold, wherein the elevator service request command is transmitted to the wireless signal apparatus via the wireless connection.

20. The method according to claim 13, wherein the elevator service request command comprises an elevator service request command representing an elevator call request and/or an elevator service request command representing a destination floor.

21. A non-transitory computer readable storage medium, storing a computer program, wherein the program can be executed by a processor to implement the steps of the method for requesting an elevator service according to claim 13.

* * * * *